(12) United States Patent
Liu et al.

(10) Patent No.: US 11,914,609 B2
(45) Date of Patent: Feb. 27, 2024

(54) METHOD FOR INTERCONNECTING DATA LAKE AND RELATIONAL DATABASE

(71) Applicants: Nanhu laboratory, Jiaxing (CN); Beijing Big Data Advanced Technology Research Institute, Beijing (CN)

(72) Inventors: Hao Liu, Jiaxing (CN); Tao Zhang, Jiaxing (CN); Lei Zhang, Jiaxing (CN); Peng Wang, Jiaxing (CN); Zhefeng Liu, Jiaxing (CN); Zhiling Chen, Jiaxing (CN); Qiuye Wang, Jiaxing (CN); Wei Chen, Jiaxing (CN); Yinlong Liu, Jiaxing (CN); Chenxi Yu, Jiaxing (CN)

(73) Assignees: NANHU LABORATORY, Jiaxing (CN); BEIJING BIG DATA ADVANCED TECHNOLOGY RESEARCH INSTITUTE, Beijing (CN)

(*) Notice: Subject to any disclaimer, the term of this patent is extended or adjusted under 35 U.S.C. 154(b) by 0 days.

(21) Appl. No.: 18/086,253

(22) Filed: Dec. 21, 2022

(65) Prior Publication Data
US 2023/0222138 A1 Jul. 13, 2023

(30) Foreign Application Priority Data
Jan. 12, 2022 (CN) .......................... 202210029283.7

(51) Int. Cl.
*G06F 16/25* (2019.01)
*G06F 16/28* (2019.01)

(52) U.S. Cl.
CPC .......... *G06F 16/254* (2019.01); *G06F 16/288* (2019.01)

(58) Field of Classification Search
CPC .............................. G06F 16/254; G06F 16/288
See application file for complete search history.

(56) References Cited

U.S. PATENT DOCUMENTS

| 10,706,045 B1* | 7/2020 | Hasija ................... G06F 16/243 |
| 2015/0356094 A1* | 12/2015 | Gorelik ............... G06F 16/2457 |
| | | 707/748 |

(Continued)

FOREIGN PATENT DOCUMENTS

| CN | 111221791 A | 6/2020 |
| CN | 111679871 A | 9/2020 |
| CN | 114048260 B | 9/2022 |

OTHER PUBLICATIONS

Hoschek, Wolfgang, and Gavin McCance. "Grid enabled relational database middleware." Global Grid Forum. vol. 3. 2001. (Year: 2001).*

(Continued)

*Primary Examiner* — Mohsen Almani
(74) *Attorney, Agent, or Firm* — Venable LLP

(57) ABSTRACT

The present disclosure provides a method for interconnecting a data lake and a relational database, including the following steps: S1: adding a data source class of a relational database to a data lake; S2: matching and using, by the data lake, a data source class of the relational database; and S3: determining and loading a corresponding driver according to the data source class, so as to connect the corresponding relational database. By cascading a data source registering configuration file, a relational database configuration file and a driver package catalog in a parameter passing method, when the data lake is started, a specific database to be used is designated unnecessarily, but a corresponding database is used directly. The configuration file is also traversed unnec- (Continued)

essarily, but the user acquires configuration information as required in the parameter passing method.

9 Claims, 6 Drawing Sheets

(56) References Cited

U.S. PATENT DOCUMENTS

| | | | | |
|---|---|---|---|---|
| 2018/0052898 | A1* | 2/2018 | Allan | G06F 8/4452 |
| 2022/0237202 | A1* | 7/2022 | Orun | G06F 16/254 |
| 2022/0382852 | A1* | 12/2022 | Yang | G06F 16/951 |
| 2023/0097665 | A1* | 3/2023 | Masuda | G06F 16/9032 |
| | | | | 707/769 |
| 2023/0169079 | A1* | 6/2023 | Saxena | G06F 16/24569 |
| | | | | 707/718 |
| 2023/0171163 | A1* | 6/2023 | Gudipati | H04L 41/5054 |
| | | | | 709/224 |

OTHER PUBLICATIONS

Kachaoui, Jabrane, and Abdessamad Belangour. "From single architectural design to a reference conceptual meta-model: an intelligent data lake for new data insights." International Journal 8.4 (2020): 1460-1465. (Year: 2020).*

Kathiravelu, Pradeeban, and Ashish Sharma. "A dynamic data warehousing platform for creating and accessing biomedical data lakes." Data Management and Analytics for Medicine and Healthcare: Second International Workshop, DMAH 2016, Held at VLDB 2016, New Delhi, India, Sep. 9, 2016 (Year: 2016).*

Stackowiak, Robert, and Robert Stackowiak. "Infrastructure Integration." Azure Internet of Things Revealed: Architecture and Fundamentals (2019): 145-162. (Year: 2019).*

First Office Action dated Feb. 28, 2022 in Chinese Patent Application No. 202210029283.7.

Second Office Action dated Mar. 23, 2022 in Chinese Patent Application No. 202210029283.7.

Decision to Grant Patent Right dated Aug. 9, 2020 in Chinese Patent Application No. 202210029283.7.

* cited by examiner

Relational database configuration file

```
relationaldb.mysql1.url=...
relationaldb.mysql1.driver=...
relationaldb.mysql1.user=...
relationaldb.mysql1.password=...
   .......

relationaldb.mysql2.url=...
relationaldb.mysql2.driver=...
relationaldb.mysql2.user=...
relationaldb.mysql2.password=...
   .......

METHOD FOR INTERCONNECTING DATA LAKE AND RELATIONAL DATABASE

CROSS REFERENCE TO RELATED APPLICATION

This patent application claims the benefit and priority of Chinese Patent Application No. 202210029283.7, filed with the China National Intellectual Property Administration on Jan. 12, 2022, the disclosure of which is incorporated by reference herein in its entirety as part of the present application.

TECHNICAL FIELD

The present disclosure belongs to the technical field of data lakes, and particularly relates to a method for interconnecting a data lake and a relational database.

BACKGROUND

With the rapid development of Internet of things (IoT), cloud computing, remote sensing, fifth-generation (5G) technology, and so on, various types of data have been increased remarkably in recent years. In terms of a data structure, there are four types of data, including structured data, semi-structured data, unstructured data, and binary data. For storage of the data, it is a common practice for enterprises and public institutions to establish independent databases according to businesses or departments, which causes data islands, hard sharing between data, and a low utilization rate of the data.

As the era of big data comes, the structured data has been applied more widely. However, the structured data in many fields is singly stored in relational databases, and cannot be shared with other data to form data islands.

A data lake is deemed as a large storage system capable of storing raw data of the enterprises and keeping contents of the raw data. It supports storage of the structured data, semi-structured data, unstructured data, binary data, etc. In the data lake, the data is available for access, processing, analysis and transmission, and even a mass of data is analyzed and processed. Hence, through the data lake, data in the relational databases can be shared with other data. However, there hasn't been an effective method for directly interconnecting the data lake and the relational database till now.

SUMMARY

In view of the above-mentioned problems, an objective of the present disclosure is to provide a method for interconnecting a data lake and a relational database.

In order to achieve the above-mentioned objective, the present disclosure employs the following technical solutions:

A method for interconnecting a data lake and a relational database includes the following steps:

S1: adding a data source class of a relational database to a data lake;

S2: matching and using, by the data lake, a data source class of the relational database; and S3: determining and loading a corresponding driver according to the data source class, so as to connect the corresponding relational database.

According to the method for interconnecting a data lake and a relational database, the adding a data source class of a relational database in step S1 includes:

S11: determining that a data source class to be added is the data source class of the relational database, and labeling an identifier (ID) name of the data source class; and S12: adding an ID name-including package path of the data source class to a data source registering configuration file of the data lake.

According to the method for interconnecting a data lake and a relational database, the matching and using a data source class of the relational database in step S2 includes:

S21: passing, by the data lake, the ID name of the data source class of the relational database through an interface parameter;

S22: matching the ID name in step S21 with ID names of data source classes in the data source registering configuration file; and S23: using a data source class with a matched ID name.

According to the method for interconnecting a data lake and a relational database, in step S3, a relational database configuration file is matched according to the data source class of the relational database, the relational database configuration file storing basic information of various relational databases; and the data lake determines and loads the corresponding driver according to basic information of a current relational database so as to connect the current relational database.

According to the method for connecting a data lake and a relational database, basic information of the various relational databases includes database names of corresponding relational databases; and in step S3, basic information of a corresponding relational database is read in the database configuration file by passing a database name.

According to the method for connecting a data lake and a relational database, the relational databases each correspond to one or more database instances, and the relational database configuration file stores basic information of various database instances;

the basic information of the database instances includes instance names of corresponding database instances, and the instance names each include a database name of a relational database to which a corresponding database instance belongs; and in step S3, basic information of a corresponding database instance is read in the database configuration file by passing an instance name, and the corresponding database instance is obtained.

According to the method for connecting a data lake and a relational database, the basic information includes driver names, and in step S3, the corresponding driver is determined and loaded according to a driver name in the basic information.

According to the method for connecting a data lake and a relational database, the data lake includes a driver package catalog, configured to store driver packages of the various relational databases and record a corresponding relation between the driver packages and the driver names; and in step S3, after a driver package in the driver package catalog is matched according to the driver name in a parameter passing method, the driver package is loaded and connected to the corresponding database instance.

According to the method for connecting a data lake and a relational database, the data lake further includes a data field type converting configuration file; in response to a write operation, to-be-written data of the database instance is converted into a corresponding Java database connectivity (JDBC) type, and the JDBC type is then converted into a field type of the data lake through the data field type converting configuration file; and in response to a read operation, to-be-read data of the data lake is converted into a corresponding JDBC type through the data field type converting configuration file, and the JDBC type is then converted into a field type of a corresponding database instance.

According to the method for connecting a data lake and a relational database, when modification information of the relational database configuration file is detected in a started state of the data lake, current configuration information is locked for current data read/write, and modified configuration information is used for next data read/write.

The present disclosure has the following advantages:

The method of the present disclosure supports efficient connection and bidirectional read/write between the data lake and the relational database, and connects data in the relational database with other data through the data lake to prevent data islands.

By providing a data source registering configuration file for registration of data source classes, providing a database configuration file for configuration of database information, and providing a driver package catalog for storage of database drivers, when an instance of a relational database is to be added subsequently, the present disclosure only needs to configure information of the database configuration file, such that the connection of the data lake for the relational database is extended flexibly.

By cascading the data source registering configuration file, the relational database configuration file and the driver package catalog in the parameter passing method, when the data lake is started, a specific database to be used is designated unnecessarily, but a corresponding database is used directly. The configuration file is also traversed unnecessarily, but the user acquires configuration information as required in the parameter passing method.

In response to a read/write operation, by passing the instance name of the relational database in the relational database configuration file, the present disclosure can switch different database instances without stopping the database to implement hot swap of the relational database.

At present, the data type is converted with a code. However, the present disclosure converts the data type with the configuration file without writing a source code, and can obtain a field type conversion relation by analyzing a configuration item in the configuration file, thereby simplifying the conversion process, and improving the conversion efficiency.

BRIEF DESCRIPTION OF THE DRAWINGS

FIG. 1 is a schematic view of a multi-instance relational database configuration file according to the present disclosure;

DETAILED DESCRIPTION OF THE EMBODIMENTS

Figure 2:
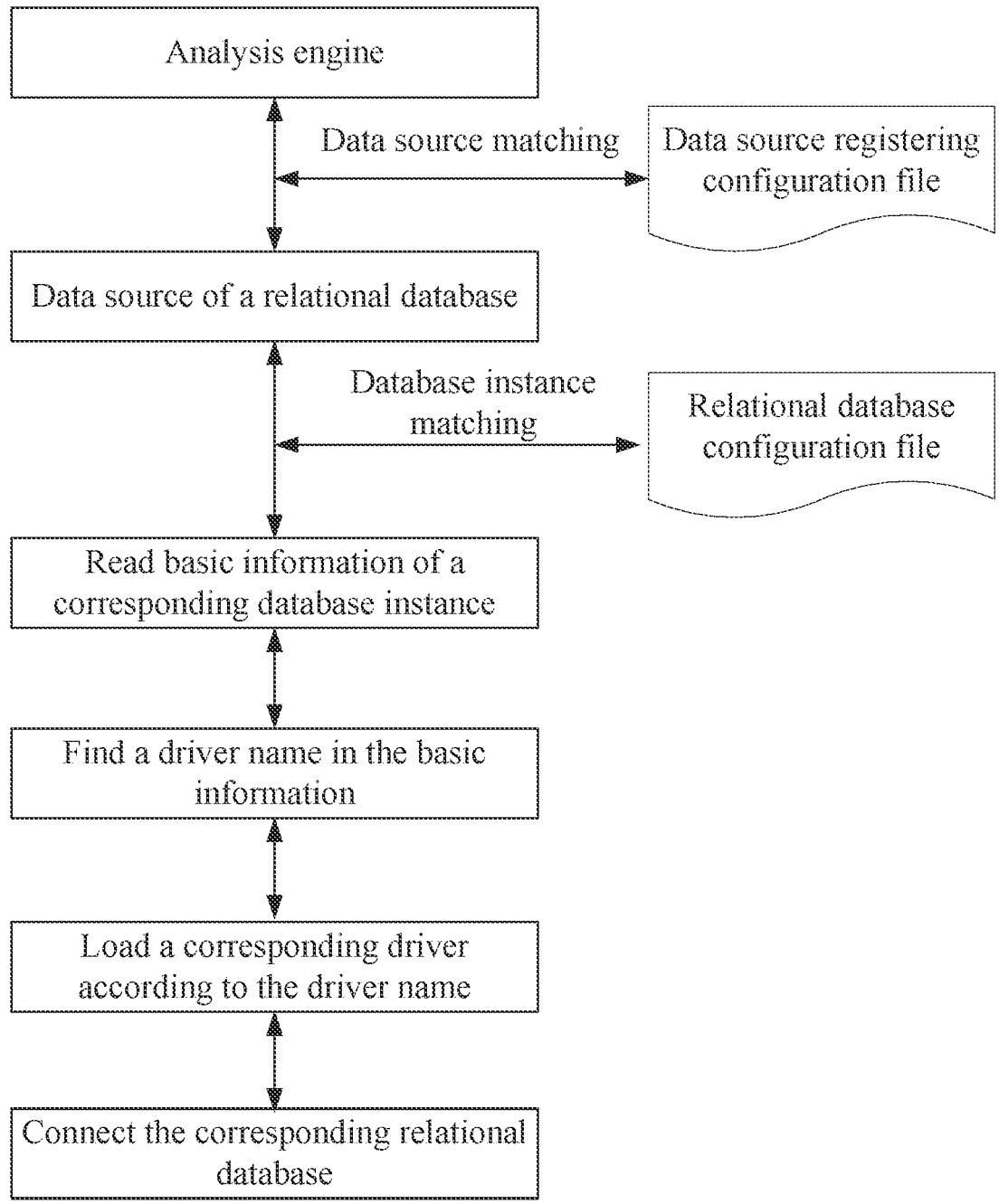
FIG. 2 is a flowchart of a method for interconnecting a data lake and a relational database according to the present disclosure.

The present disclosure is further described below with reference to the accompanying drawings.

An embodiment discloses a method for interconnecting a data lake and a relational database, including the following steps:

1. A data source class of a relational database is added to a data lake, and a unique ID name is labeled for the data source class. For example, the relational database is named as relationaldb in the embodiment. According to the present disclosure, all relational databases each can be configured with a plurality of database instances. The database instances have different instance names. The instance names each include a database name of a relational database to which a corresponding instance belongs. For example, three MySQL databases are configured, and respectively named as mysql1, mysql2, and mysql3. Herein, mysql serves as a name of a MySQL relational database. Beside connection with the MySQL relational database, the present disclosure further supports connection with other relational databases, such as Oracle and SQL Server relational databases.

A package path of the data source class of the relational database is added to a data source registering configuration file of the data lake. The package path includes the ID name. For example, the package path of the data source class of the relational database in the embodiment is com.nanhulab.bigdata.skqs.structured.relational.RelationDBDataSource. In response to an operation of a user to the relational database, only the ID name "relationaldb" of the RelationDBDataSource class is passed. The data lake passes the ID name of the data source class of the relational database through an interface parameter, matches the ID name with ID names of data source classes in the data source registering configuration file, and uses a data source class with a matched ID name.

2. As shown in FIG. 1, the data lake includes a relational database configuration file. The relational database configuration file stores basic information of various database instances. The basic information includes instance names of corresponding database instances. The instance names each include a database name of a relational database to which a corresponding database instance belongs. In the figure, there are a plurality of database instances in one relational database. In a scenario where one relational database only corresponds to one database instance, basic information may directly include a database name of the corresponding relational database, and the database instance is not named or recorded independently to the basic information.

Further, the basic information of the database instances further includes driver names. Basic information of database instances in a same relational database includes a same driver name. In addition, the basic information further includes urls, users, and passwords, which are filled unnecessarily when the database instances are used.

The data lake passes the ID name of the data source class of the relational database through the interface parameter, matches a data source of the relational database from the data source registering configuration file, matches a database instance from the relational database configuration file according to an instance name in a parameter passing method, reads basic information of the corresponding database instance in the relational database configuration file to obtain a corresponding database instance, and determines that the database to be connected belongs to the database instance. The relational database configuration file is put into a conf folder under a run directory of the data lake.

3. Drivers of the relational databases mainly refer to various JDBC drivers. The instances in the same relational database use a same driver. For versions of the drivers used by the various relational databases, see information on official database websites. A JDBC Jar driver package (driver package) of the relational database is used as a dependency in the embodiment. The data lake includes a driver package catalog. Before use of the driver package catalog, driver packages of the relational databases are put into the driver package catalog. Meanwhile, a corresponding relation between the driver packages and the driver names is also recorded in the driver package catalog. The specific recording form is not limited herein, and may be, for example, implemented by changing names of the driver packages as the driver names.

The system determines a driver name according to basic information of a current database instance in the relational database configuration file, matches a corresponding driver package in the driver package catalog according to the driver name in the parameter passing method, loads the driver package, and connects the driver package to the corresponding database instance.

As shown in FIG. 2, an analysis engine acquires various data from a data lake system for analysis. Specifically, the analysis engine performs matching on data source classes in the data source registering configuration file by parameter passing to search a data source class to be used currently. The method is applied to interconnection with various relational databases. The data source classes are data sources of the relational databases. The database configuration file is read and analyzed to obtain information of a relational database to be used currently. A specific JDBC driver is matched by field mapping and the parameter passing, and then connected to the corresponding relational database.

Figure 3:
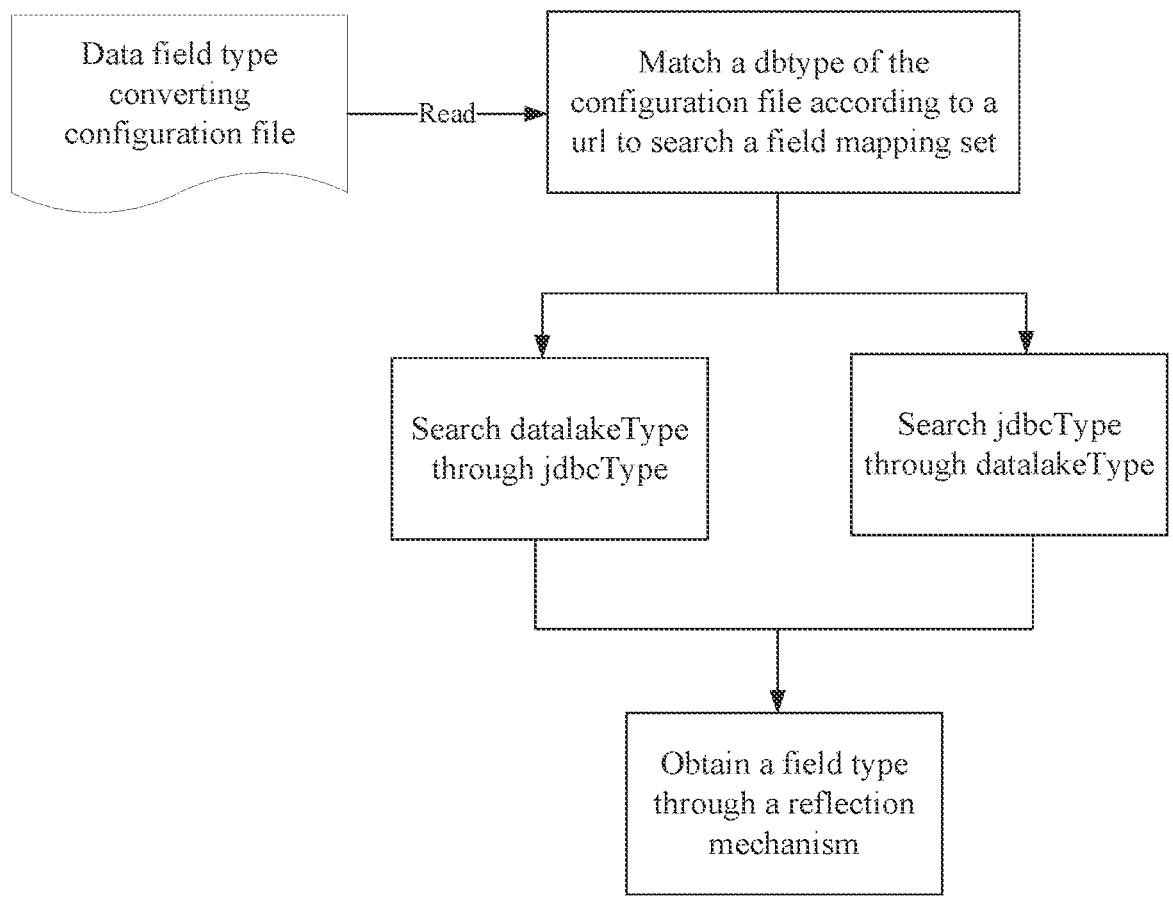
FIG. 3 is a flowchart of field conversion according to the present disclosure.

Further, when data are read from a database instance, the database instance is converted into a JDBC type according to a JDBC driving rule of the database instance. The method for converting the database instance into the JDBC type may be the conventional means, and will not be repeated herein. In this case, data of the JDBC type is further converted into a data type supported by the data lake. As shown in FIG. 3, a data field type converting configuration file is further provided. The data field type converting configuration file is used when the data of the JDBC type is converted into the data type supported by the data lake. Some contents of the data field type converting configuration file are described below:

```
{
"relationdb ": [
{
```

```
"dbtype": "oracle",
"field": [
{
"datalakeType": BooleanType",
"jdbcType": "BOOLEAN"
},
{
"datalakeType": "LongType"
"jdbcType": "BIGINT"
}
...
]
},
{
"dbtype": "sqlserver",
"field": [
{
"datalakeType": "TimestampYype"
"jdbcType": "TIMESTAMP"
}
...
]
},
...
]
}
``` where, dbtype represents a database type, including mysql, oracle and sqlserver types of relational databases, field represents a field, datalakeType represents a field type of the data lake, and jdbcType represents a JDBC field type. The datalakeType is searched through the jdbcType, and the jdbcType is searched through the datalakeType, thereby realizing conversion of the field type. Specifically, when the field type in the database instance is converted into the field type of the data lake, a database type dbtype is matched according to a url of the database instance to search a field mapping set. A field type name and a jdbcType of the database instance are matched in the field to search a name of the field type of the data lake, namely datalakeType. A corresponding field type is searched with a reflection mechanism. When the field type of the data lake is converted into the field type of the relational database instance, the method is similar to the above.

Figure 4:
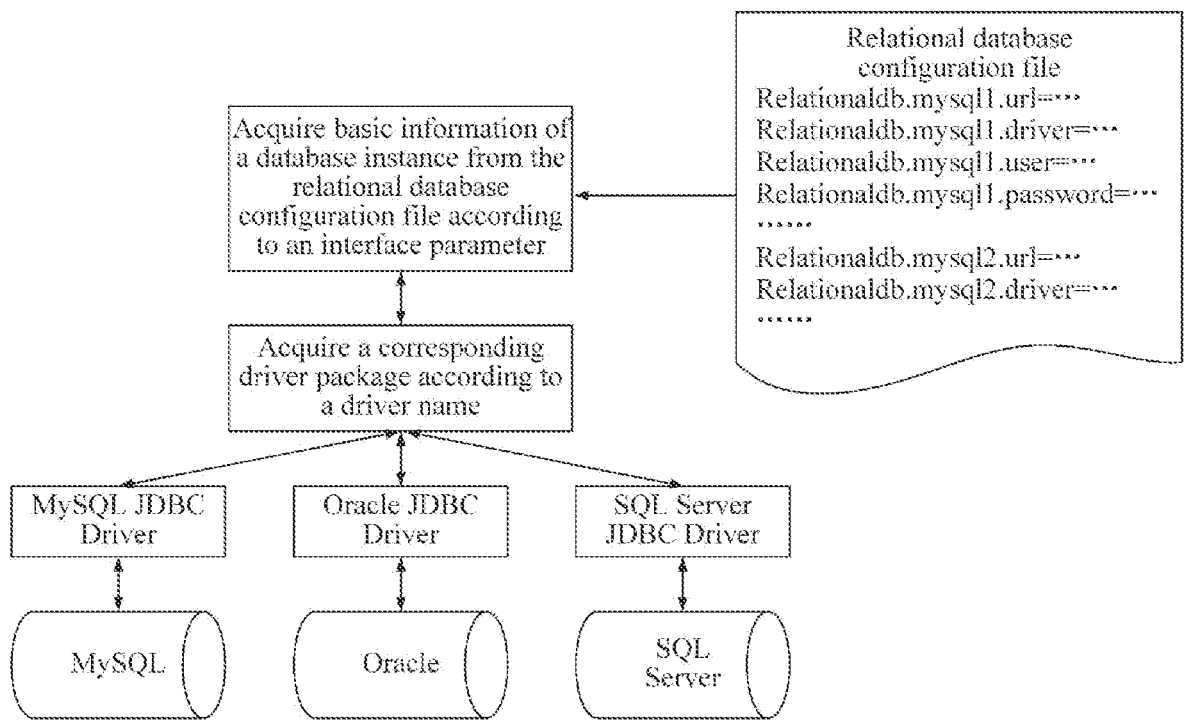
FIG. 4 is a schematic view for loading a JDBC driver according to the present disclosure.
Figure 5:
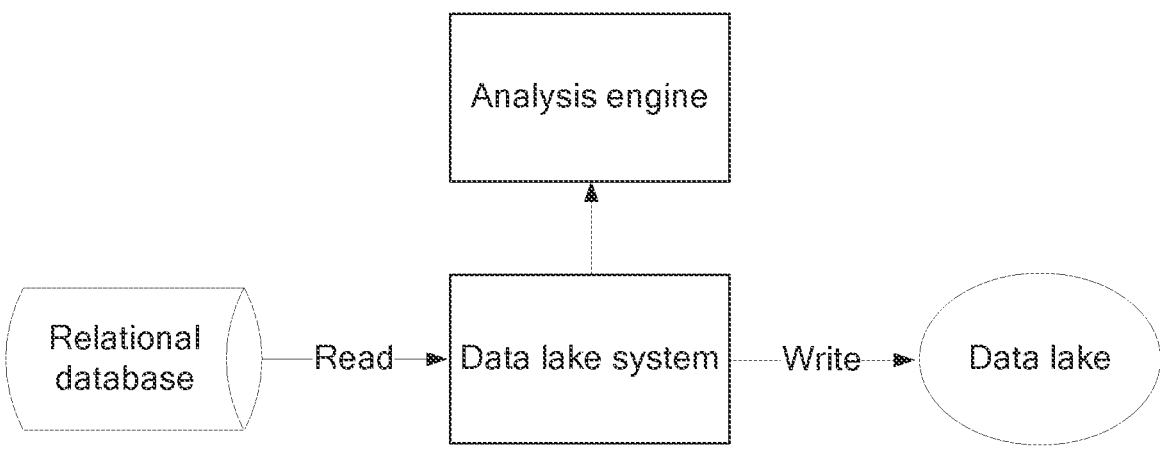
FIG. 5 is a first schematic view illustrating bidirectional read/write between a data lake and a relational database according to the present disclosure.

As shown in FIG. 4, the system acquires basic information of the database instance from the configuration file according to the ID name such as relationaldb.mysql1 in the parameter passing, loads the driver from the driver package catalog according to a driver name in the basic information, and is connected to the corresponding database through the driver, thereby implementing the specific database operation. For example, the system is connected to MySQL through a MySQL JDBC driver, and connected to Oracle through an Oracle JDBC driver. With the configuration file, parameter input when the data lake is connected to the relational database is simplified to achieve a better ease of use.

Data acquired by the data lake from the database may be available for the analysis engine, and may also be stored to the data lake through a storage interface of the data lake. In addition, data stored in the data lake may be read by a readout interface of the data lake. The read data may be available for the analysis engine, and may also be stored to a corresponding database through the storage interface of the data lake. Therefore, bidirectional read/write between the data lake and the database is implemented.

Figure 6:
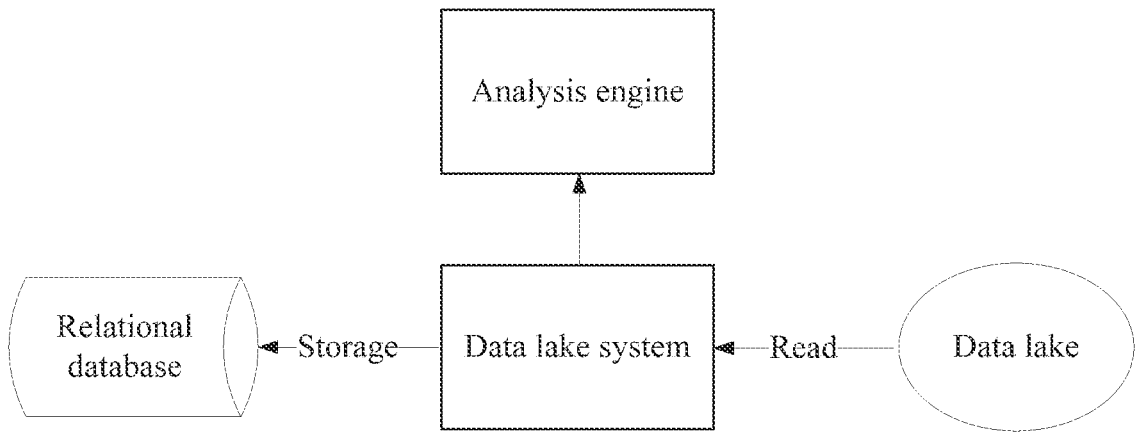
FIG. 6 is a second schematic view illustrating bidirectional read/write between a data lake and a relational database according to the present disclosure.
Figure 7:
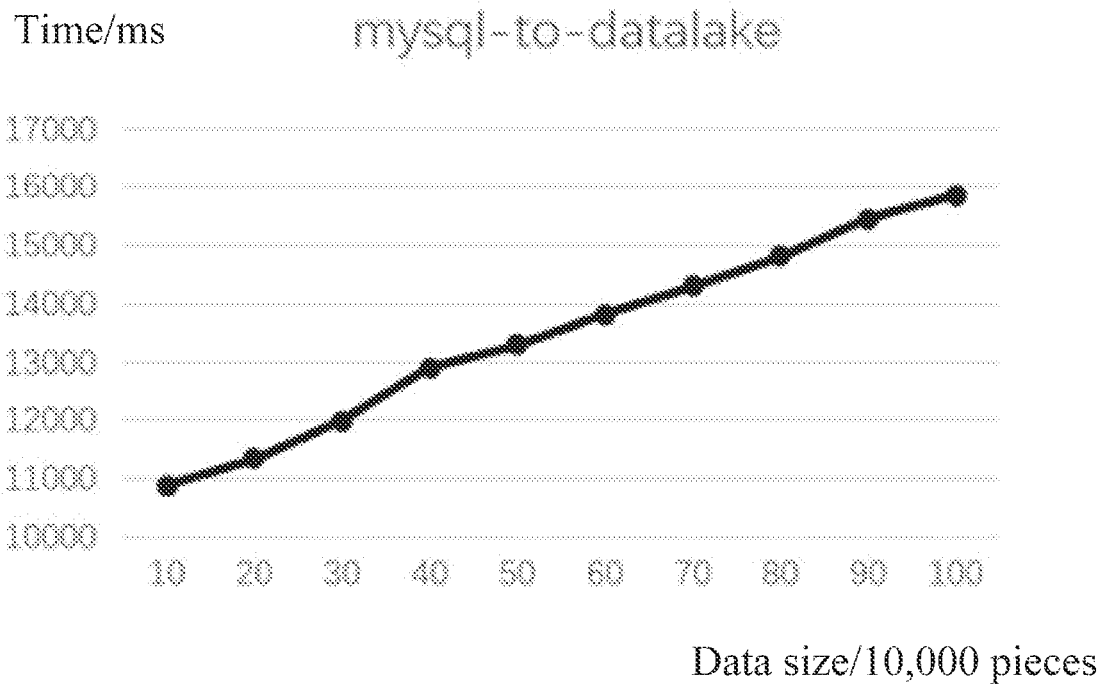
FIG. 7 illustrates experimental time results of data from a relational database to a data lake based on a method for interconnecting a data lake and a relational database in the present disclosure.

As shown in FIG. 6 and FIG. 7, the data read from the relational database is subjected to type conversion in FIG. 3 to form the data type supported by the data lake for the analysis engine. The data may also be stored to the data lake through the storage interface of the data lake. Reversely, structured data stored in the data lake may be read by the readout interface of the data lake for the analysis engine. The data may also be stored to the corresponding database through the storage interface of the data lake.

By cascading a data source registering configuration file, a database configuration file and a driver package catalog in a parameter passing method, when the data lake is started, a specific database instance to be used is designated unnecessarily, but the parameter passing is performed directly as required to use the corresponding database instance. Likewise, the database instance is switched directly in the parameter passing method, which can implement hot swap of the database instance.

Preferably, when modification information of the relational database configuration file is detected in a started state of the data lake, current configuration information is locked for current data read/write, and modified configuration information is used for next data read/write. In this way, the present disclosure supports hot modification of the database configuration file without stopping the started data lake. After the configuration file is modified, modified configuration information is used in next data read/write.

The present disclosure tests bidirectional read/write between the relational database and the data lake specially. With mysql as an example, bidirectional read/write time from 100,000 rows of data to 1.000.000 rows of data is counted.

| Bidirectional test time (ms) on mysql-datalake | | |
|---|---|---|
| Data size (10,000 rows) | mysql-to-datalake | datalake-to-mysql |
| 10 | 10884 | 21242 |
| 20 | 11343 | 31140 |
| 30 | 11994 | 41796 |
| 40 | 12897 | 51804 |
| 50 | 13296 | 60204 |
| 60 | 13814 | 70570 |
| 70 | 14308 | 81175 |
| 80 | 14805 | 90482 |
| 90 | 15459 | 101130 |
| 100 | 15863 | 110354 |

Figure 8:
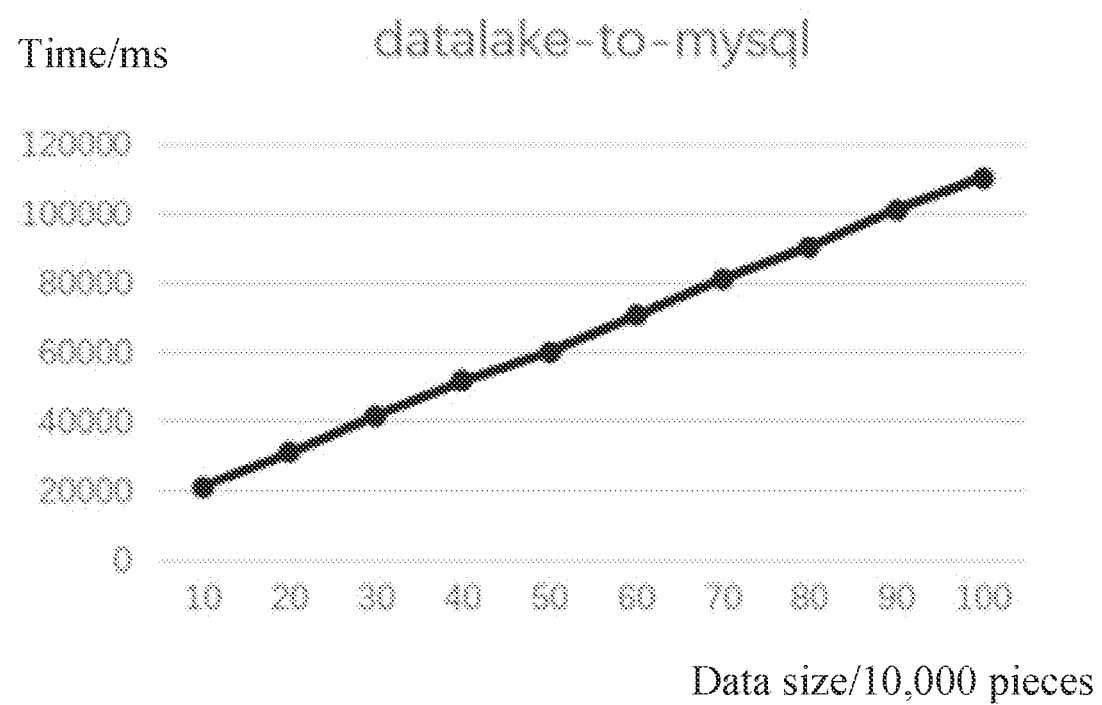
FIG. 8 illustrates experimental time results of data from a data lake to a relational database based on a method for interconnecting a data lake and a relational database in the present disclosure.

FIGS. 7-8 show bidirectional read/write on the data of the relational database based on the method for interconnecting a data lake and a relational database. Even in case of 100,000 pieces of data, there only need 11,000 ms for converting the data into the format supported by the data lake, and 20,000 ms for converting the data into the format supported by the relational database. The read/write efficiency is high. As the data size increases, the bidirectional read/write time shows a (nearly) linear increase, indicating that the time increases stably with the increase of the data size. As can be seen, the present disclosure not only implements the bidirectional read/write between the relational database and the data lake by using the configuration file, but also achieves efficient bidirectional read/write performance for an efficient and stable data type conversion speed, and realizes the efficient interconnection for the data lake and the relational database.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

Although terms such as the data lake, data source class, database, database instance, ID name, database configuration file, and data source registering configuration file are used extensively herein, the possibility of using other terms is not excluded. The terms are only intended to describe and explain the essence of the present disclosure more conveniently. It is contrary to the spirit of the present disclosure to interpret these terms as any additional limitation.

What is claimed is:

1. A method for interconnecting a data lake and a relational database, comprising the following steps:
S1: adding a data source class of a relational database to a data lake;
S2: matching and using, by the data lake, a data source class of the relational database; and
S3: determining and loading a corresponding driver according to the data source class, so as to connect the corresponding relational database, wherein
the adding a data source class of a relational database in step S1 comprises:
S11: determining that a data source class to be added is the data source class of the relational database, and labeling an identifier (ID) name of the data source class; and
S12: adding an ID name-comprising package path of the data source class to a data source registering configuration file of the data lake;
the matching and using a data source class of the relational database in step S2 comprises:
S21: passing, by the data lake, the ID name of the data source class of the relational database through an interface parameter;
S22: matching the ID name in step S21 with ID names of data source classes in the data source registering configuration file; and
S23: using a data source class with a matched ID name;
in step S3, a relational database configuration file is matched according to the data source class of the relational database, the relational database configuration file storing basic information of various relational databases; and the data lake determines and loads the corresponding driver according to basic information of a current relational database so as to connect the current relational database; and
when modification information of the relational database configuration file is detected in a started state of the data lake, current configuration information is locked for current data read/write, and modified configuration information is used for next data read/write.

2. The method for interconnecting a data lake and a relational database according to claim 1, wherein basic information of the various relational databases comprises database names of corresponding relational databases; and
in step S3, basic information of a corresponding relational database is read in the database configuration file by passing a database name.

3. The method for interconnecting a data lake and a relational database according to claim 2, wherein the relational databases each correspond to one or more database instances, and the relational database configuration file stores basic information of various database instances;
the basic information of the database instances comprises instance names of corresponding database instances, and the instance names each comprise a database name of a relational database to which a corresponding database instance belongs; and in step S3, basic information of a corresponding database instance is read in the database configuration file by passing an instance name, and the corresponding database instance is obtained.

4. The method for interconnecting a data lake and a relational database according to claim 2, wherein the basic information comprises driver names, and in step S3, the corresponding driver is determined and loaded according to a driver name in the basic information.

5. The method for interconnecting a data lake and a relational database according to claim 3, wherein the basic information comprises driver names, and in step S3, the corresponding driver is determined and loaded according to a driver name in the basic information.

6. The method for interconnecting a data lake and a relational database according to claim 4, wherein the data lake comprises a driver package catalog, configured to store driver packages of the various relational databases and record a corresponding relation between the driver packages and the driver names; and in step S3, after a driver package in the driver package catalog is matched according to the driver name in a parameter passing method, the driver package is loaded and connected to the corresponding database instance.

7. The method for interconnecting a data lake and a relational database according to claim 5, wherein the data lake comprises a driver package catalog, configured to store driver packages of the various relational databases and record a corresponding relation between the driver packages and the driver names; and in step S3, after a driver package in the driver package catalog is matched according to the driver name in a parameter passing method, the driver package is loaded and connected to the corresponding database instance.

8. The method for interconnecting a data lake and a relational database according to claim 6, wherein the data lake further comprises a data field type converting configuration file; in response to a write operation, to-be-written data of the database instance is converted into a corresponding Java database connectivity (JDBC) type, and the JDBC type is then converted into a field type of the data lake through the data field type converting configuration file; and in response to a read operation, to-be-read data of the data lake is converted into a corresponding JDBC type through the data field type converting configuration file, and the JDBC type is then converted into a field type of a corresponding database instance.

9. The method for interconnecting a data lake and a relational database according to claim 7, wherein the data lake further comprises a data field type converting configuration file; in response to a write operation, to-be-written data of the database instance is converted into a corresponding Java database connectivity (JDBC) type, and the JDBC type is then converted into a field type of the data lake through the data field type converting configuration file; and in response to a read operation, to-be-read data of the data lake is converted into a corresponding JDBC type through the data field type converting configuration file, and the JDBC type is then converted into a field type of a corresponding database instance.

\* \* \* \* \*